(12) United States Patent
Nishida et al.

(10) Patent No.: US 6,371,617 B1
(45) Date of Patent: Apr. 16, 2002

(54) PROJECTOR

(75) Inventors: Kazuhiro Nishida, Matsumoto; Tomiyoshi Ushiyama, Minowa-machi, both of (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/481,450

(22) Filed: Jan. 13, 2000

(30) Foreign Application Priority Data

Jan. 14, 1999 (JP) ............................................ 11-007421

(51) Int. Cl.[7] .............................................. G03B 21/28
(52) U.S. Cl. ........................ 353/122; 353/102; 353/98
(58) Field of Search ............................. 353/38, 31, 33, 353/34, 37, 98, 99, 122, 102; 385/901, 146, 133

(56) References Cited

U.S. PATENT DOCUMENTS

| | | | |
|---|---|---|---|
| 5,634,704 A | * 6/1997 | Shikama et al. | 353/31 |
| 5,795,049 A | * 8/1998 | Gleckman | 353/122 |
| 5,868,481 A | * 2/1999 | Conner et al. | 353/38 |
| 5,884,991 A | * 3/1999 | Levis et al. | 353/122 |
| 5,902,033 A | * 5/1999 | Levis et al. | 353/122 |
| 6,139,156 A | * 10/2000 | Okamori et al. | 353/98 |
| 6,231,190 B1 | * 5/2001 | Dewald | 353/31 |

FOREIGN PATENT DOCUMENTS

| | | | |
|---|---|---|---|
| GB | 2324166 A | * 10/1998 | |
| JP | 4-182691 | 6/1992 | |

* cited by examiner

*Primary Examiner*—William Dowling
(74) *Attorney, Agent, or Firm*—Oliff & Berridge, PLC

(57) ABSTRACT

The invention concerns achieving an increase in illumination efficiency of an illumination optical system in a projector using an optical modulation device. A projector may include an optical modulation device for controlling a direction of emission of illumination light applied to a substantially rectangular light application surface, including a plurality of pixels, for each pixel according to image information to thereby emit image light representing an image, an illuminating optical system for emitting the illumination light so that the central axis of the illumination light applied to the light application surface enters the light application surface at a predetermined angle, and a projection optical system for projecting the image light emitted from the optical modulation device. The illuminating optical system may include a light source, and a light-transmitting rod through which the light emitted from the light source passes. At least a part of the light passes while being repeatedly reflected by an inner surface of the light-transmitting rod. The light-transmitting rod has a shape such that a sectional area perpendicular to the central axis of the light-transmitting rod monotonically increases from the incident side to the emitting side.

4 Claims, 9 Drawing Sheets

PROJECTOR

BACKGROUND OF THE INVENTION

1. Field of Invention

The present invention relates to a projector for projecting and displaying an image.

2. Description of Related Art

In a projector, image light representing an image is formed from illumination light by the use of an electro-optical apparatus, and an image is displayed by projecting the image light. As the electro-optical apparatus, an optical modulation device for modulating the illumination light according to image information and emitting the image light representing the image is used. As an example of a micro-mirror-type optical modulation device, a micro-mirror-type optical modulation device, such as a Digital Micro-mirror Device (a registered trademark of Texas Instruments, Inc.; hereinafter referred to as "DMD") can be given.

The DMD has a plurality of micro-mirrors corresponding to a plurality of pixels constituting the image. The inclination of the micro-mirrors varies with image information, and the micro-mirrors reflect light according to the inclination thereof. Of the light reflected by the micro-mirrors, the light reflected in a predetermined direction is used as image light. That is, the DMD is an electro-optical apparatus of a type which controls the direction of reflection of light entered at a predetermined angle so as to form image light. Therefore, when an optical modulation device such as the DMD is used as an electro-optical apparatus for a projector, in order to realize a high-precision and bright image, illumination light applied to the optical modulation device may preferably be entered at the highest possible precise predetermined angle.

The illumination light emitted from an illuminating optical system, however, actually has various incident angles. For this reason, the illumination light having an angle beyond the allowable range of a predetermined incident angle cannot be used as image light. Consequently, there is a problem in that illumination efficiency of the illuminating optical system is deteriorated. In addition, this problem also occurs in optical modulation devices for controlling the direction of emission of illumination light applied to a light application surface, including a plurality of pixels, for each pixel according to image information to thereby emit image light representing an image.

SUMMARY OF THE INVENTION

It is an aspect of this invention to provide a technique for achieving an increase in illumination efficiency of an illuminating optical system in a projector using an optical modulation device for controlling a direction of emission of illumination light applied to a light application surface, including a plurality of pixels, for each pixel according to image information to thereby emit image light representing an image.

According to the present invention, a projector, may include: an optical modulation device for controlling a direction of emission of illumination light applied to a substantially rectangular light application surface, including a plurality of pixels, for each pixel according to image information to thereby emit image light representing an image, an illuminating optical system for emitting the illumination light so that the central axis of the illumination light applied to the light application surface enters the light application surface at a predetermined angle, and a projection optical system for projecting the image light emitted from the optical modulation device.

The illuminating optical system may include a light source, and a light-transmitting rod through which the light emitted from the light source passes, at least a part of the light passing while being repeatedly reflected by an inner surface of the light-transmitting rod. The light-transmitting rod has a shape such that a sectional area perpendicular to the central axis of the light-transmitting rod monotonically increases from the incident side to the emitting side.

According to the above projector, the angle of the light passing through the light-transmitting rod to enter the inner surface of the light-transmitting rod (incident angle) gradually increases each time the reflection is repeated, so that the angle of light relative to the central axis of the illumination light emitted from the light-transmitting rod can be reduced. Consequently, the angular distribution of the illumination light having various angles can be reduced. This can increase the precision of the incident angle of the illumination light applied to the light application surface of the optical modulation device, so that the illumination efficiency of the illuminating optical system can be increased, and a bright projected image can be displayed.

Here, the light-transmitting rod may have a shape such that the size of each side of a cross section perpendicular to the central axis of the light-transmitting rod linearly increases from the incident side to the emitting side. Thus, the light-transmitting rod can be manufactured relatively easily.

In the above projector, at least an outline shape of an emitting surface of the light-transmitting rod may preferably be a quadrilateral having first and second diagonal lines of different lengths. When the illumination light emitted from the light-transmitting rod obliquely enters the light application surface at the predetermined angle, the quadrilateral may preferably be set so that the ratio of two diagonal lines of a quadrilateral illumination area to which the illumination light is applied comes closer to 1 than the ratio of the lengths of the first and second diagonal lines.

This allows the outline shape of the illumination area to approach the light application surface having substantially a rectangular shape, even if the illumination light obliquely enters the light application surface at the predetermined angle. Therefore, illumination efficiency of the illumination light applied to the light application surface of the optical modulation device can be further increased.

DETAILED DESCRIPTION OF PREFERRED EMBODIMENTS

Embodiments of the present invention will now be described with reference to the drawings. In the following embodiments, unless otherwise specified, three mutually perpendicularly intersecting directions are conveniently referred to as follows: the direction of travel of light is referred to as the z-axis direction (direction parallel to an optical axis), the direction of 12 o'clock as viewed from the z-axis direction is referred to as the y-axis direction (vertical direction), and the direction of 3 o'clock is referred to as the x-axis direction (horizontal direction).

Figure 1:
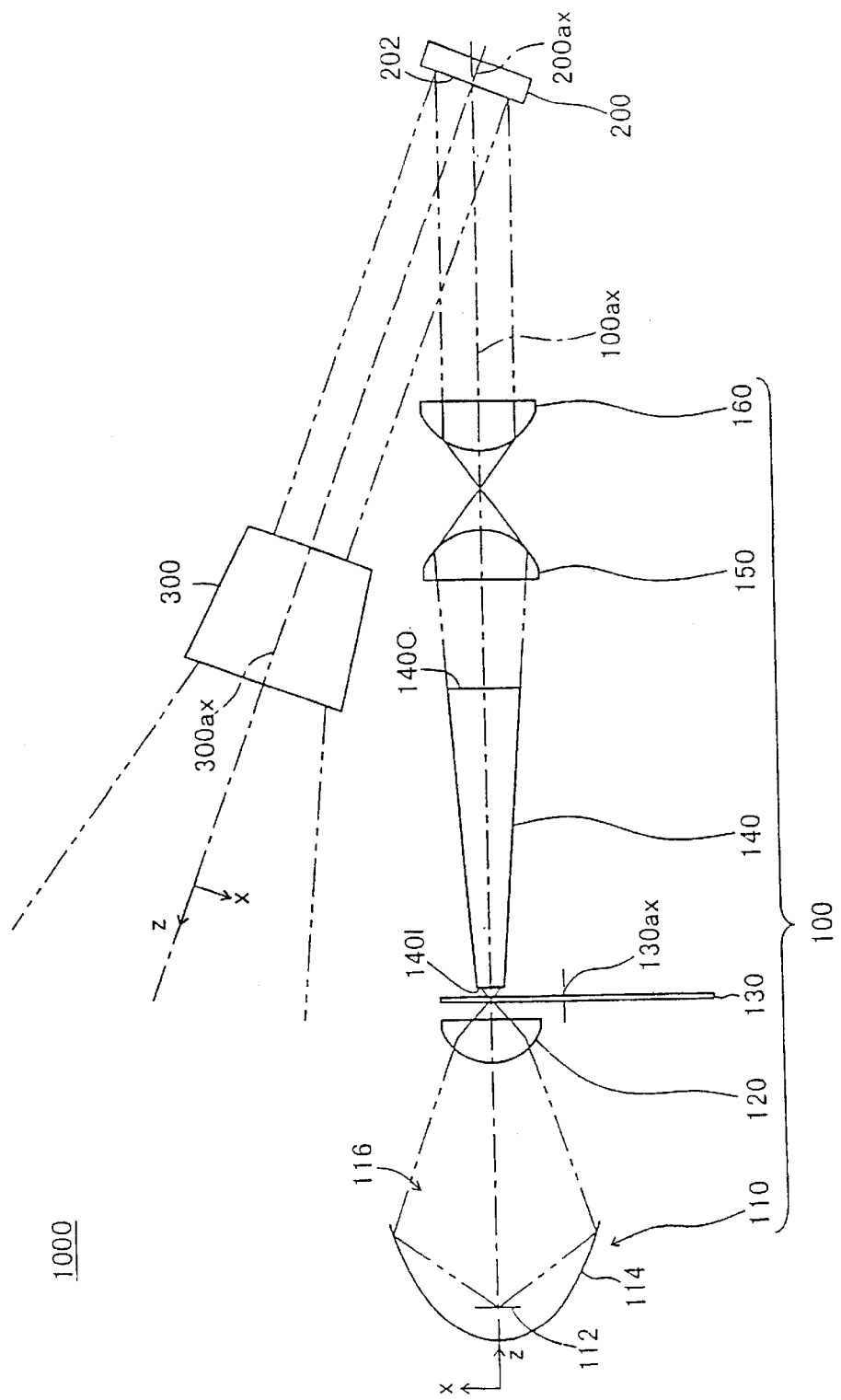
FIG. 1 is a schematic plan view showing a construction of a principal part of a projector according to a first embodiment of the present invention.

FIG. 1 is a schematic plan view showing a construction of a principal part of a projector according to a first embodiment of the present invention. The projector 1000 includes an illuminating optical system 100, a micro-mirror-type optical modulation device 200, and a projection lens 300. The micro-mirror-type optical modulation device 200 and the projection lens 300 are disposed so that central axes 200ax and 300ax thereof coincide with each other. The illuminating optical system 100 is disposed in such a manner that the central axis 100ax of the illuminating optical system has a predetermined inclination with respect to the central axis 200ax (normal line 202n of a light application surface 202) of the micro-mirror-type optical modulation device 200 due to the restriction of an incidence angle of light illuminating the micro-mirror-type optical modulation device 200, as described hereinbelow. Here, the "light application surface" means a light application surface in a narrow sense which is an area on which the applied light can be used as image light, that is, on which a micro-mirror described hereinbelow is formed. In the following description, however, the entire area to which light is applied including the outside of the area on which the micro-mirror is formed may be referred to as the light application surface.

The illuminating optical system 100 includes a light source 110, a first condenser lens 120, a color wheel 130, a light-transmitting rod 140, a second condenser lens 150, and a field lens 160. These optical elements 110, 120, 130, 140, 150, and 160 are disposed in this order along the central axis 100ax of the illuminating optical system 100.

The light source 100 has a light source lamp 112 and a concave mirror 114. The light source lamp 112 is a radiation light source for emitting radiating light beams. A high-pressure discharge lamp, such as a metal halide lamp or a high-pressure mercury lamp, may be used as the light source lamp 112. The concave mirror 114 is an ellipsoidal concave mirror for emitting radiating light beams from the light source lamp 112 as condensed light from an opening 116 so that the radiating light beams are reflected to enter the first condenser lens 120. As the concave mirror 114, a parabolic concave mirror for reflecting the radiating light beams from the light source lamp 112 and emitting them as substantially parallel light beams may be used. In this case, another condenser lens may be added between the light source 10 and the first condenser lens 120 so that the substantially parallel light beams enter the first condenser lens 120. In addition, a lens having a small F-number may be used as a first condenser lens 120 so that the substantially parallel light beams enter the first condenser lens 120.

The first condenser lens 120 is an optical element for condensing light from the light source 110 on the color wheel 130 so as to reduce the size of a light spot applied to the color wheel 130.

Figure 2:
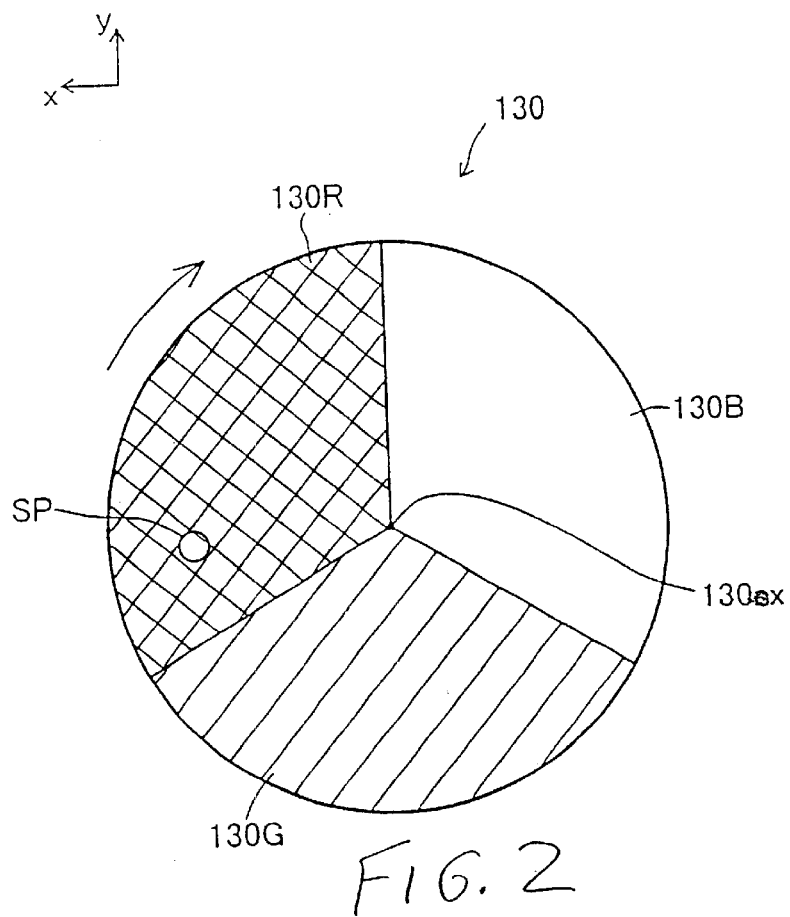
FIG. 2 is a front view of a color wheel as viewed from the side of a light source 110.

FIG. 2 is a front view of the color wheel 130 as viewed from the side of the light source 110. The color wheel 130 has three transmissive color filters 130R, 130G, and 130B formed on three fan-shaped areas that are divided in a direction of rotation thereof. A first color filter 130R has the function of transmitting light in a red wavelength region (hereinafter, referred to as "red light R") and of reflecting or absorbing light in other wavelength regions. Similarly, second and third color filters 130G and 130B have the function of transmitting light in a green wavelength region and light in a blue wavelength region (hereinafter, referred to as "green light G" and "blue light B", respectively) and of reflecting or absorbing light in other wavelength regions, respectively. The color filter is formed of, for example, a dielectric multilayer film or a filter sheet formed by using a dye.

The color wheel 130 is disposed so that a light spot SP condensed by the first condenser lens 120 is applied to a predetermined peripheral position deviating from a central axis 130ax of the color wheel 130. The color wheel 130 is rotated by a motor (not shown) about the rotation axis 130ax at a constant speed. In this case, the light spot SP cyclically illuminates the areas of the color filters 130R, 130G, and 130B at a constant interval in accordance with the rotation of the color wheel 130. Consequently, the light transmitted by the color wheel 130 is cyclically changed to the red light R, the green light G, and the blue light B in accordance with the rotation of the color wheel 130.

The illumination light passes through the light-transmitting rod 140 while being repeatedly reflected by the inner surface of the light-transmitting rod 140 shown in FIG. 1. Consequently, the light-transmitting rod 140 has the function of emitting light of a uniform illumination distribution even if the illumination distribution of light emitted from the light source 110 is not uniform. That is, the light-transmitting rod 140 has the function of a so-called integrator optical system. Such a light-transmitting rod is called integrator rod.

Figure 3:
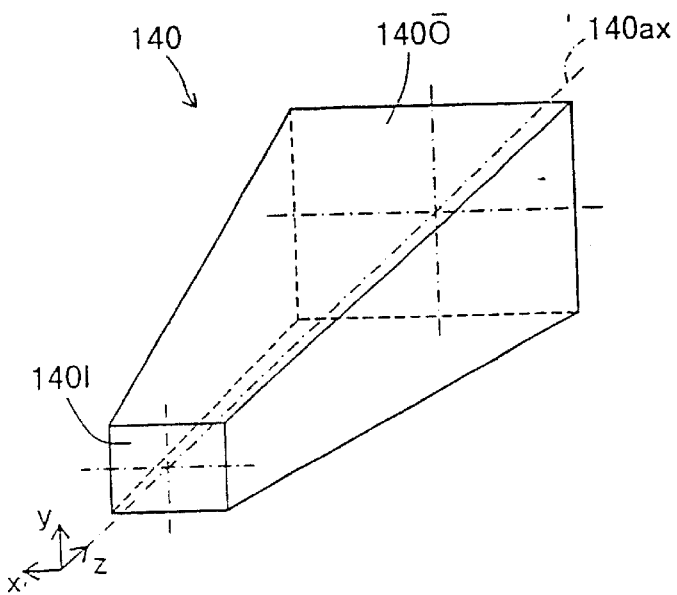
FIG. 3 is a perspective view showing an external appearance of a light-transmitting rod 140.

FIG. 3 is a perspective view showing an external appearance of the light-transmitting rod 140. The light-transmitting rod 140 is substantially rectangular in cross section perpendicular to the central axis 140ax, and is a columnar prism in which a cross section adjacent to an emitting-side side face 140O is larger than a cross section adjacent to an incident-side side face 140I. The light-transmitting rod 140 will be further described hereinbelow.

The light emitted from the light-transmitting rod 140 is condensed by the second condenser lens 150 to enter the field lens 160. The two lenses 150 and 160 form an image of an emitting plane of the light-transmitting rod 140 on the light application surface 202 of the micro-mirror-type optical modulation device 200.

In the manner as described above, the illuminating optical system 100 uniformly illuminates the light application surface 202 of the micro-mirror-type optical modulation device 200 by the functions of the optical elements 110, 120, 130, 140, 150, and 160.

Figure 4A:
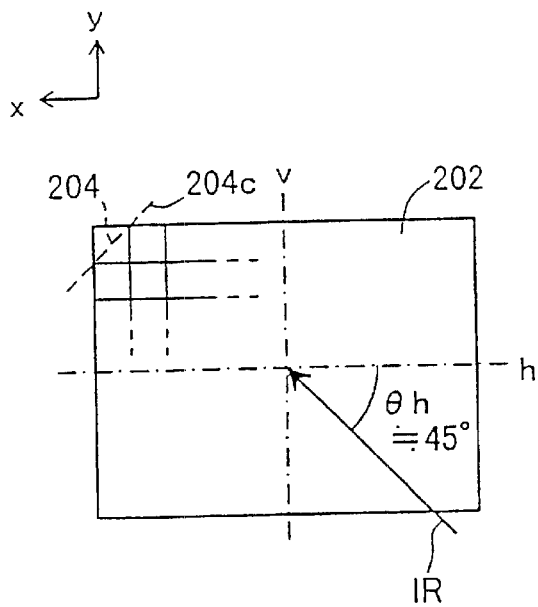
FIGS. 4(A)–4(C) includes explanatory views each showing a DMD that is an example of a micro-mirror-type optical modulation device.
Figure 4B:
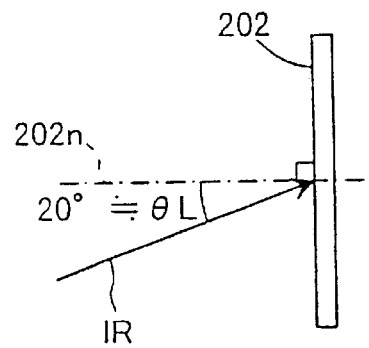
Figure 4C:
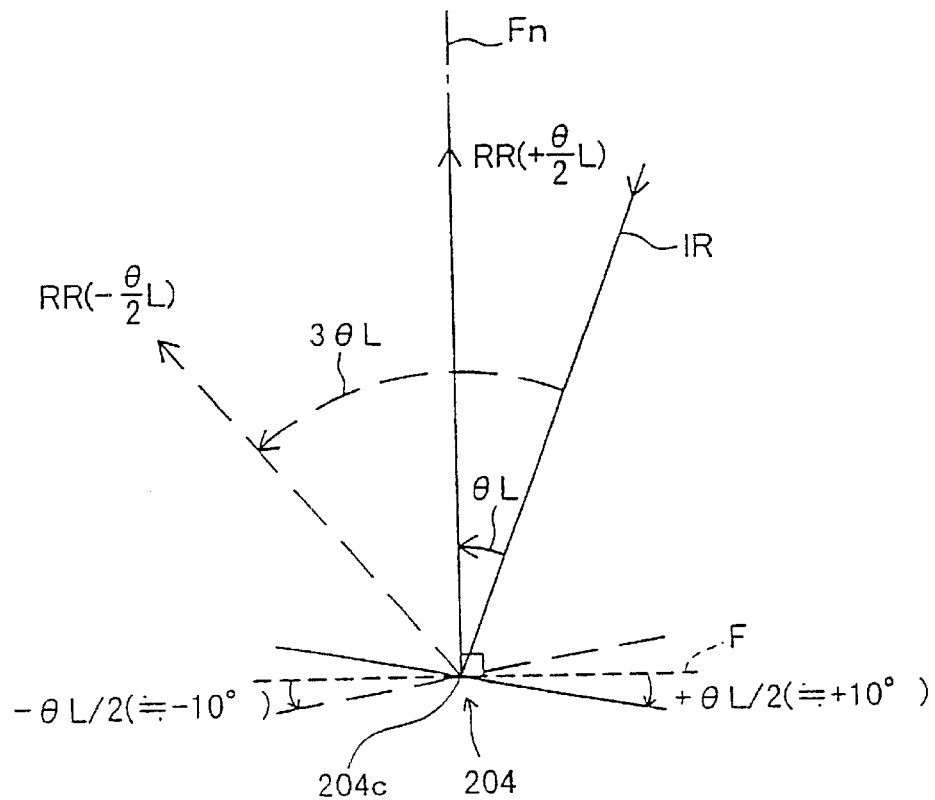

The micro-mirror-type optical modulation device 200 is an optical modulation device for emitting image light representing an image toward the projection lens 300 by reflecting the illumination light applied to the light application surface 202 by a micro-mirror according to image information. FIGS. 4(A)–4(C) includes explanatory views each showing a DMD that is an example of the micro-mirror-type optical modulation device 200. As shown in FIG. 4(A), a plurality of micro-mirrors 204, each having a substantially square outline, are formed on the light application surface 202 of the DMD 200 in the form of a matrix. Each micro-mirror 204 is formed to be rotatable about a rotation axis 204c, which is a diagonal line obtained by connecting lower left and upper right vertexes thereof, within a predetermined angular range. These micro-mirrors 204 correspond to pixels constituting the image.

Here, to simplify the description, the illumination light applied to the light application surface 202 is indicated by a central ray (incident ray) IR representing the illumination light. In addition, a horizontal axis passes through an incident position of the illumination light IR to the light application surface 202 and is parallel to the x-axis is referred to as h, and the vertical axis parallel to the y-axis is referred to as v. In order to simplify the construction of the device, the illumination light IR applied to the DMD 200 may preferably have an incident surface perpendicular to the rotation axes 204c of the micro-mirrors 204. For this reason, the illumination light IR applied to the DMD 200, as shown in FIG. 4(A), is allowed to enter in a direction diagonally from the lower right so that an inclination θh of the optical path of the illumination light IR projected on the x-y plane parallel to the light application surface 202 with respect to the horizontal axis h is about 45 degrees. In addition, as shown in FIG. 4(B), the illumination light IR is allowed to enter so that an incident angle θL to the light application surface 202 is about 20 degrees in a plane that is perpendicular to the light application surface 202 and including the optical path of the illumination light IR.

FIG. 4(C) shows an incident surface including light incident on the micro-mirror 204, and light reflected therefrom, that is, an optical path in a cross section perpendicular to the rotation axis 204c. The micro-mirror 204 is rotated about ±(θL/2) degrees (à±10 degrees) around the rotation axis 204c relative to a plane F (shown by a broken line in FIG. 4(C)) parallel to the light application surface 202. Angles along a clockwise direction are referred to as positive angles. As described above, the illumination light IR enters the micro-mirror 204 from a direction inclined −θL (à−20 degrees) relative to the normal line Fn of the plane F.

When the micro-mirror 204 is inclined by +(θL/2) relative to the plane F, the illumination light IR is emitted as reflected light RR (+θL/2) in a direction inclined by −θL relative to the illumination light IR, that is, in a direction parallel to the normal line Fn. When the micro-mirror 204 is inclined by −(θL/2), the illumination light IR is emitted as reflected light RR (−θL/2) in a direction inclined by −(3·θL). In this way, the illumination light IR applied to the micro-mirror 204 is reflected and emitted in different directions according to the rotation angle of the micro-mirror 204. For example, when the projection lens is disposed in the direction of the reflected light RR (+θL/2), only the reflected light RR (+θL/2) is used as image light. In this way, in a state where the micro-mirror 204 is inclined by +(θL/2), the reflected light is projected through the projection lens to realize a bright display, and in a state where the micro-mirror 204 is inclined by −(θL/2), the reflected light is not projected through the projection lens to realize a dark display. An intermediate gray scale is achieved by a method for controlling the ratio of light and dark displays according to the gray scale in a fixed time period in which one pixel draws an image (a so-called pulse width modulation method).

In the projector 1000 of this embodiment, the projection lens 300 is disposed in such a manner that the reflected light in a state where the micro-mirror 204 is inclined by +(θL/2) is used as the image light. This allows the image light emitted from the micro-mirror-type optical modulation device 200 according to image information to be projected through the projection lens 300, and an image is thereby displayed.

In addition, the red light R, the green light G, and the blue light B are cyclically emitted at constant intervals from the illuminating optical system 100 according to the rotation of the color wheel 130. In this case, by controlling the micro-mirrors 204 of the micro-mirror-type optical modulation device 200 according to the image information corresponding to the applied color light, a color image can be displayed.

The projector 1000 of the present invention is, as described above, characterized by the shape of the light-transmitting rod 140. That is, as shown in FIG. 3, the device is characterized in that the light-transmitting rod 140 is a columnar prism in which the cross section adjacent to the emitting-side side face 140$\overline{O}$ is larger than the cross section adjacent to the incident-side side face 140I. The light-transmitting rod 140 is formed into the above shape for the following reasons.

The illumination light of the illuminating optical system 100 is applied to the light application surface 202 of the micro-mirror-type optical modulation device 200 not from the direction of the normal line 202n of the light application surface 202, but from the direction inclined by a fixed inclination θL relative to the normal line 202n, as described with reference to FIG. 4(A)–4(C). Of the illumination light, only the light reflected by the micro-mirrors 204 of the light application surface 202 toward the projection lens 300 is used as image light.

Figure 5A:
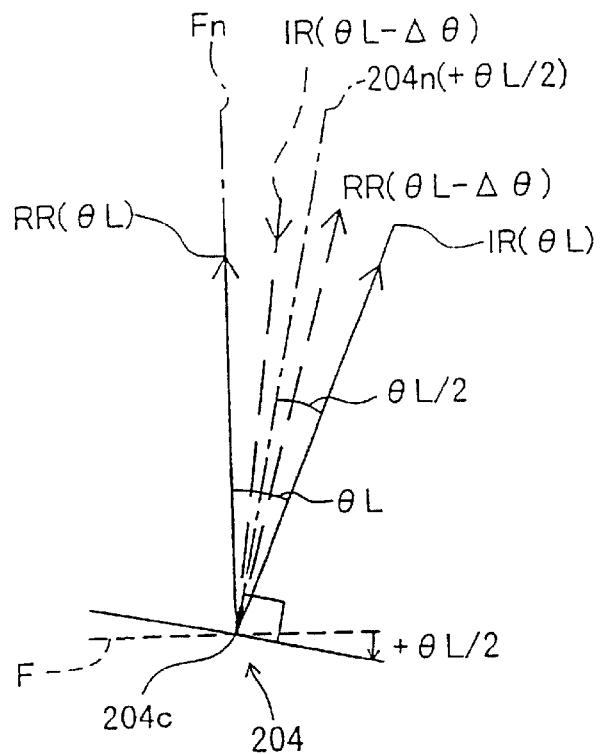
FIGS. 5(A)–5(B) includes explanatory views showing an incident angle of illumination light applied to a micro-mirror, and a direction of reflection of a reflected light.
Figure 5B:
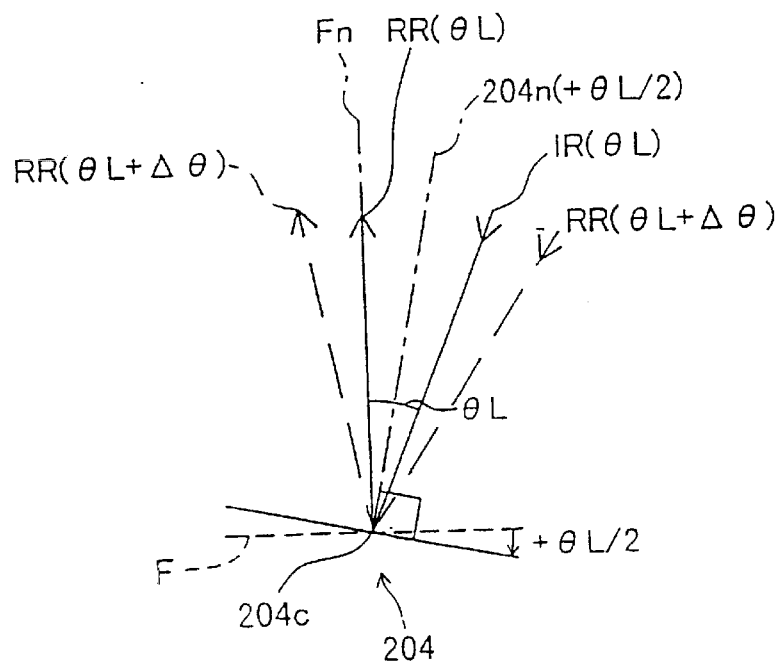

FIGS. 5(A)–5(B) includes explanatory views showing the incident angle of the illumination light applied to the micro-mirror 204, and the direction of reflection of the reflected light. As shown in FIGS. 5(A)–5(B), the incident light IR (θL) entered from the direction inclined by +θL relative to the normal line Fn of the plane F is reflected in the direction of the normal line Fn, that is, toward the projection lens 300, and is emitted as the reflected light RR (θL) when the micro-mirror 204 is inclined by +(θL/2). However, as shown in FIG. 5(A), incident light IR (θL−Δθ) entered from the direction inclined by +(θL−Δθ) relative to the normal line Fn is reflected in a direction inclined toward the incident light IR (θL) from the normal line Fn, and is emitted as reflected light RR (θL−Δθ). In addition, as shown in FIG. 5(B), the incident light IR (θL+Δθ) entered from the direction inclined by +(θL+Δθ) relative to the normal line Fn is reflected in a direction inclined toward the opposite side of the incident light IR (θL) relative to the normal line Fn, and is emitted as reflected light RR (θL+Δθ). The reflected light tends to be inclined relative to the normal line Fn as an angle variation amount Δθ relative to the incident light IR (θL) increases. Therefore, if the illumination light includes a plurality of light beams of a large angle variation amount Δθ, light beams entering the projection lens 300 that cannot be used as image light may be increased, so that a bright image cannot be displayed. In addition, when the micro-mirror 204 is inclined by −(θL/2), light that should be reflected so as not to enter the projection lens 300 enters the projection lens 300, so that resolution of the image may be deteriorated. In particular, when the angle variation amount ±Δθ increases to be above a rotatable range ±(θL/2) of the micro-mirror 204, the amount of stray light entering the illuminating optical system 100 and the projection lens 300 is increased. From the foregoing, an angular distribution of the illumination light applied to the micro-mirror-type optical modulation device 200 may preferably be small. At least an allowable range of the angular distribution included in the illumination light is $\pm(\theta L/2)$ or less, which is a rotatable range of the micro-mirror 204, relative to a predetermined incident angle.

Figure 6:
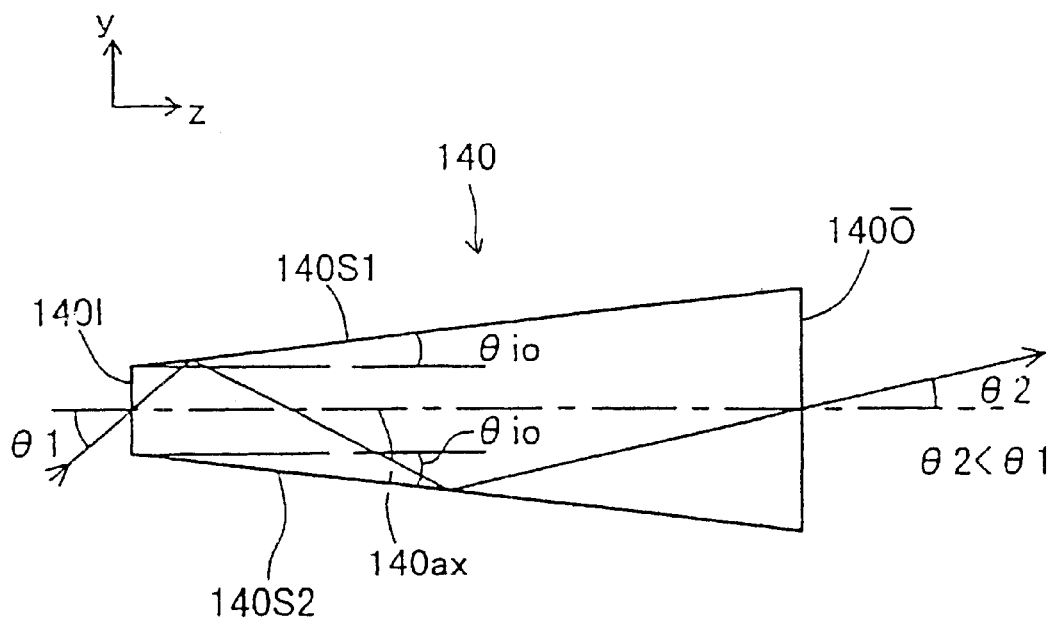
FIG. 6 is an explanatory view showing light entering the light-transmitting rod.

FIG. 6 is an explanatory view showing light entering the light-transmitting rod 140. The light entering the incident-side side face 140I is, when its incident angle θ1 is larger than the inclination θio of side faces 140S1 and 140S2 inclined relative to the central axis 140ax of the light-transmitting rod 140, repeatedly reflected by the side faces 140S1 and 140S2 to be emitted from the emitting-side side face 140$\overline{O}$. In this case, the incident angle of light to the side faces 140S1 and 140S2 increases each time the reflection is repeated. Consequently, the inclination (emitting angle) θ2 of the light emitted from the emitting-side side face 140$\overline{O}$ relative to the central axis 140ax can be made smaller than the incident angle θ1. That is, the light-transmitting rod 140 can reduce the emitting angle of light having a large incident angle. For example, if the length of the light-transmitting rod and the inclination θio of the side faces 140S1 and 140S2 are adjusted, the angular distribution of the illumination light emitted from the light-transmitting rod 140 can be set within the allowable range of $\pm(\theta L/2)$. This allows the illuminating optical system 100 to reduce the angular distribution of the illumination light, so that utilization efficiency of the illumination light applied to the micro-mirror-type optical modulation device 200 can be increased.

As described above, the projector 1000 of the present invention can reduce the angular distribution of the illumination light illuminating the light application surface 202 of the micro-mirror-type optical modulation device 200, so that the utilization efficiency of the illumination light emitted from the illuminating optical system 100 can be increased. In addition, the light application surface 202 of the micro-mirror-type optical modulation device 200 can be uniformly illuminated by the illuminating optical system 100, so that an image having uniform brightness can be displayed.

Although the light-transmitting rod 140 has been described in a case where the inclination of the side faces 140S1 and 140S2 is fixed, that is, the light-transmitting rod 140 has a shape such that the size of each side of a cross section perpendicular to the central axis 140ax of the light-transmitting rod 140 linearly increases from the incident side to the emitting side, the shape is not limited thereto. For example, the light-transmitting rod 140 may have a shape such that the size of each side of a cross section perpendicular to the central axis of the light-transmitting rod curvedly increases from the incident side to the emitting side. That is, the light-transmitting rod may have a shape such that a sectional area perpendicular to the central axis of the light-transmitting rod monotonically increases from the incident side to the emitting side. This can also reduce the angular distribution of the illumination light illuminating the light application surface 202 of the micro-mirror-type optical modulation device 200.

In addition, in this embodiment, although the DMD shown in FIG. 3 has been described as an example of the micro-mirror-type optical modulation device 200, the micro-mirror-type optical modulation device 200 is not limited thereto. For example, various modes of the incident angle of the illumination light may be considered according to the direction of the rotation axes and the rotation range of the micro-mirrors 204. According to this, various modes of the length of the light-transmitting rod 140 and the inclination θio of the side faces 140S1 and 140S2 may be considered. For example, when the rotation range $\pm(\theta L/2)$ of the micro-mirror 204 is larger than the value shown in FIGS. 4(A)–4 (C), the inclination θio of the side faces 140S1 and 140S2 of the light-transmitting rod 140 can be reduced.

In addition, although the projector 1000 of the present invention is a device including the color wheel 130 and displaying a color image, the color wheel 130 may be omitted so as to display a monochrome image.

Incidentally, the directions of the lens surfaces (convex surfaces and concave surfaces) of the optical elements 120, 150, and 160 are not limited to the directions shown in FIG. 1. They can also face in the reverse direction, and the direction of the lens surfaces of the optical elements 120, 150, and 160 may be arbitrary combined. In addition, each of the optical elements 120, 150, 160, and 300 may be formed by a compound lens having a plurality of combined lenses. Also, it is possible to replace a plurality of optical elements with a single optical element. For example, it is also possible to form a lens surface on the emitting-side side face 140$\overline{O}$ of the light-transmitting rod 140, and to omit the second condenser lens 150. In addition, the first condenser lens 120 can be omitted.

In addition, a total reflection prism may be provided between the micro-mirror-type optical modulation device 200 and the projection lens 300 to allow the illumination light emitted from the illuminating optical system 100 to be totally reflected by the light application surface 202 of the micro-mirror-type optical modulation device 200, and the image light emitted from the micro-mirror-type optical modulation device 200 may be transmitted to be emitted toward the projection lens 300.

Figure 7:
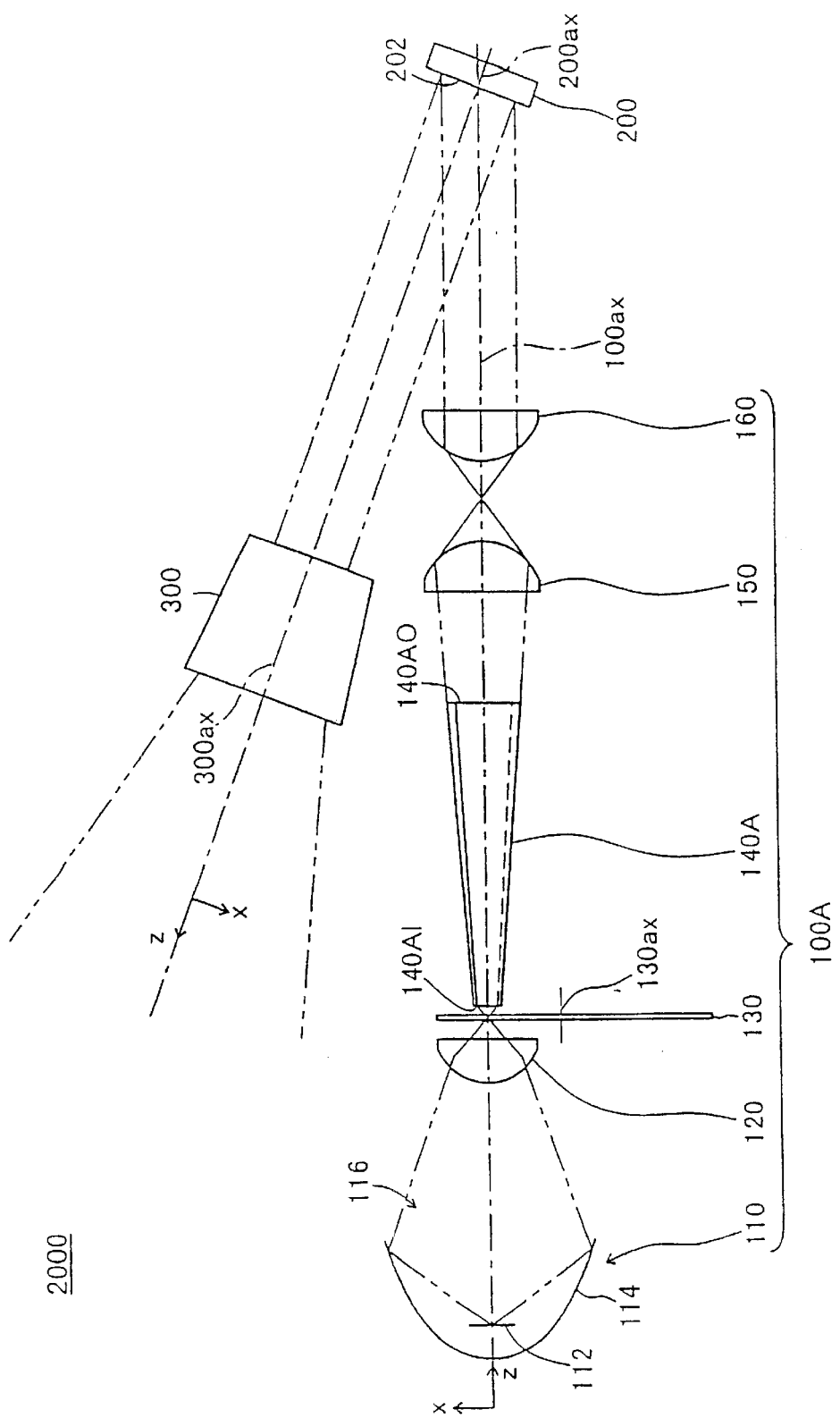
FIG. 7 is a schematic plan view showing a construction of a principal part of a projector according to a second embodiment.

Incidentally, the above modifications can also be applied to the following embodiments. FIG. 7 is a schematic plan view showing a structure of a principal part of a projector according to a second embodiment of the present invention. The projector 2000 includes an illuminating optical system 100A, a micro-mirror-type optical modulation device 200, and a projection lens 300. The illuminating optical system 100A is the same as the illuminating optical system 100 except that the light-transmitting rod 140 of the illuminating optical system 100 is replaced with a light-transmitting rod 140A.

Figure 8:
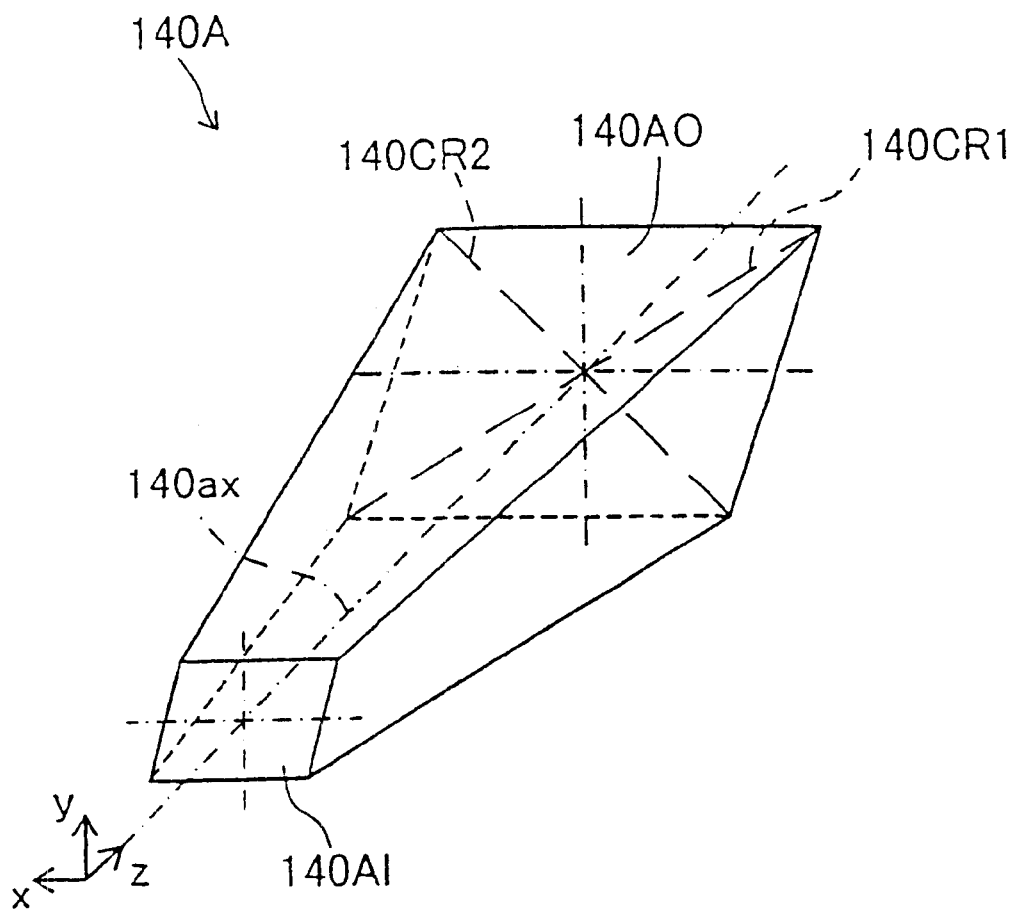
FIG. 8 is a perspective view showing an external appearance of a light-transmitting rod.

FIG. 8 is a perspective view showing the light-transmitting rod 140A. The light-transmitting rod 140A differs from the light-transmitting rod 140 shown in FIG. 3 in that a cross section perpendicular to the central axis 140ax is a parallelogram.

As shown in FIGS. 4(A)–4(C), illumination light of the illuminating optical system 100 is applied to the micro-mirror-type optical modulation device 200 not from the direction of the normal line 202n of the light application surface 202 (direction parallel to the central axis 202ax) but from the direction having a fixed inclination relative to the normal line 202n.

Figure 9A:
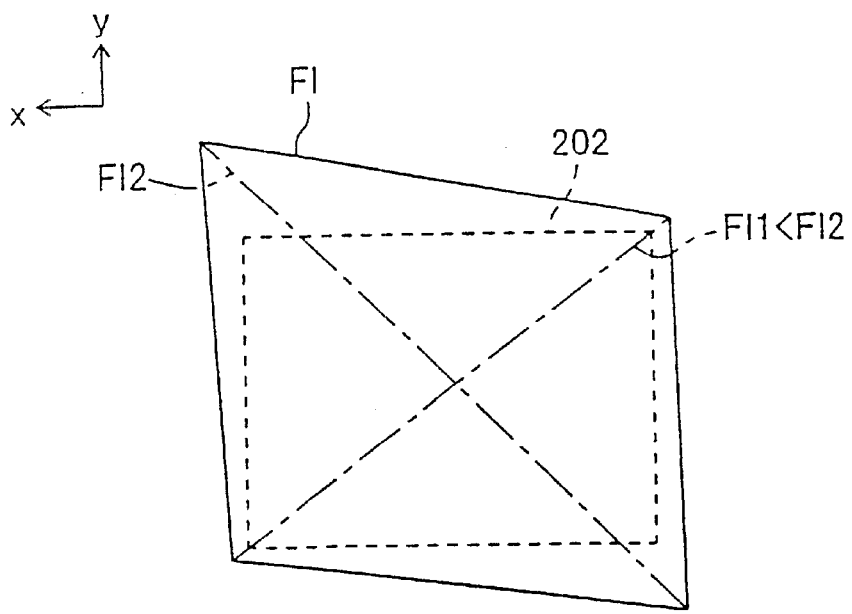
FIGS. 9(A)–9(B) includes explanatory views each showing an illumination area of illumination light applied onto a light application surface.
Figure 9B:
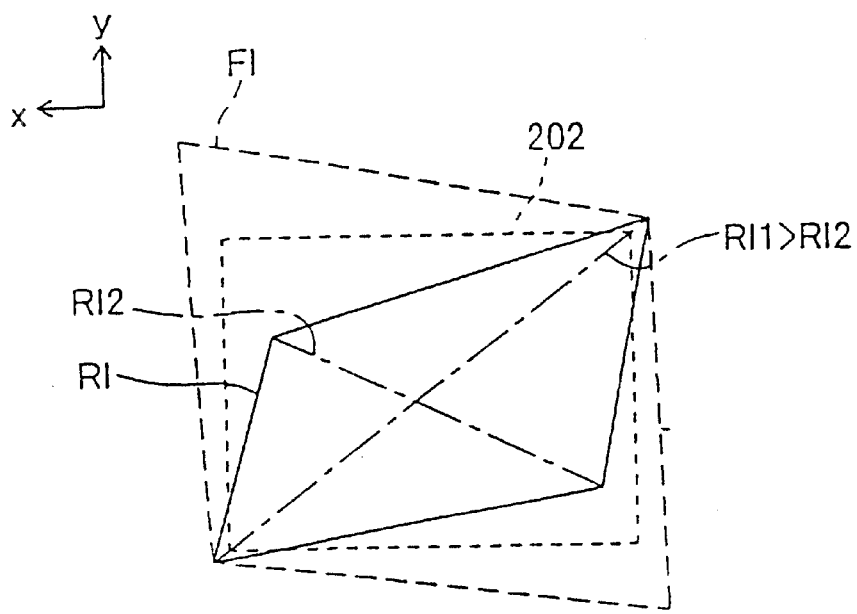

FIGS. 9(A)–9(B) includes explanatory views each showing an illumination area of the illumination light applied onto the light application surface 202. When a cross section is of a substantially rectangular shape like the light-transmitting rod 140 (FIG. 3) of the first embodiment, the illumination area FI of the illumination light applied so as to include the light application surface 202 is not of a substantially rectangular shape, but is of a distorted shape according to the incident angle thereof.

As described with reference to FIGS. 4(A)–4(C), the illumination area FI when the illumination light is applied in a direction diagonally from the lower right is of a quadrilateral such that the length of a diagonal line FI2 obtained by connecting upper left and lower right vertexes is longer than the length of a diagonal line FI1 obtained by connecting upper right and lower left vertexes, as shown in FIG. 9(A). When the illumination region FI is not of a substantially rectangular shape but is distorted, the ratio of ineffective light that is not applied to the light application surface 202 is increased. For this reason, the illumination efficiency of the illumination light emitted from the illuminating optical system 100 is decreased.

In order to decrease such ineffective light, the shape of the illumination light emitted from the illuminating optical system 100 may be distorted in advance so that the illumination area FI has a substantially rectangular shape. That is, as shown in FIG. 9(B), of two diagonal lines RI1 and RI2 of a cross section RI perpendicular to the central optical axis of the illumination light emitted from the illuminating optical system 100, the longer diagonal line RI1 may be set so as to correspond to a longer diagonal line FI2 of the distorted illumination area FI and the shorter diagonal line RI2 may be set so as to correspond to a shorter diagonal line FI1 of the distorted illumination area FI. In other words, the illuminating optical system may include an optical element in which an outline shape of an emitting surface is a quadrilateral having first and second diagonal lines of different lengths, and when the illumination light emitted from the optical element obliquely enters a light application surface at a predetermined angle, the quadrilateral may be set so that the ratio of two diagonal lines of a quadrilateral illumination area to which the illumination light is applied comes closer to 1 than the ratio of the lengths of the first and second diagonal lines. This can increase the illumination efficiency of the illuminating optical system.

In the projector 2000 of this embodiment, an emitting-side side face 140A$\overline{O}$ of the light-transmitting rod 140A has an outline shape of a parallelogram, as shown in FIG. 8. The outline of the parallelogram has, similarly to the cross section RI of the illumination light, a shape such that the length of a rod diagonal line 140CR1 corresponding to the cross sectional diagonal line RI1 is shorter than a rod diagonal line 140CR2 corresponding to the cross sectional diagonal line RI2. Therefore, ineffective light that is not applied to the light application surface 202 can be decreased. This can increase the illumination efficiency of the light emitted from the light-transmitting rod 140A. In this case, in order to allow the illumination light emitted from the illuminating optical system 100 to be used more effectively, the light-transmitting rod 140A may be actually preferably rotated around the central optical axis thereof to adjust the shape of the illumination area.

In addition, a cross-sectional shape of the light-transmitting rod 140A as viewed from the side of a light source 110 may be similar to the shape of the cross section RI shown in FIG. 9(B). This allows the illumination area FI of the light emitted from the light-transmitting rod 140A to be similar to the outline of the light application surface 202. Consequently, the illumination efficiency owing to the light emitted from the light-transmitting rod 140A can be increased. In addition, at least the outline of the emitting-side side face 140$\overline{O}$ of the light-transmitting rod 140A may be similar to the cross section RI. That is, when the light emitted from the light-transmitting rod obliquely enters the light application surface at a predetermined angle, the light-transmitting rod may be set so that the ratio of the lengths of two diagonal lines of the quadrilateral illumination area to which the illumination light is applied comes closer to 1 than at least the ratio of the two diagonal lines of the emitting surface of the light-transmitting rod. This can increase the illumination efficiency owing to the light emitted from the light-transmitting rod.

Figure 10:
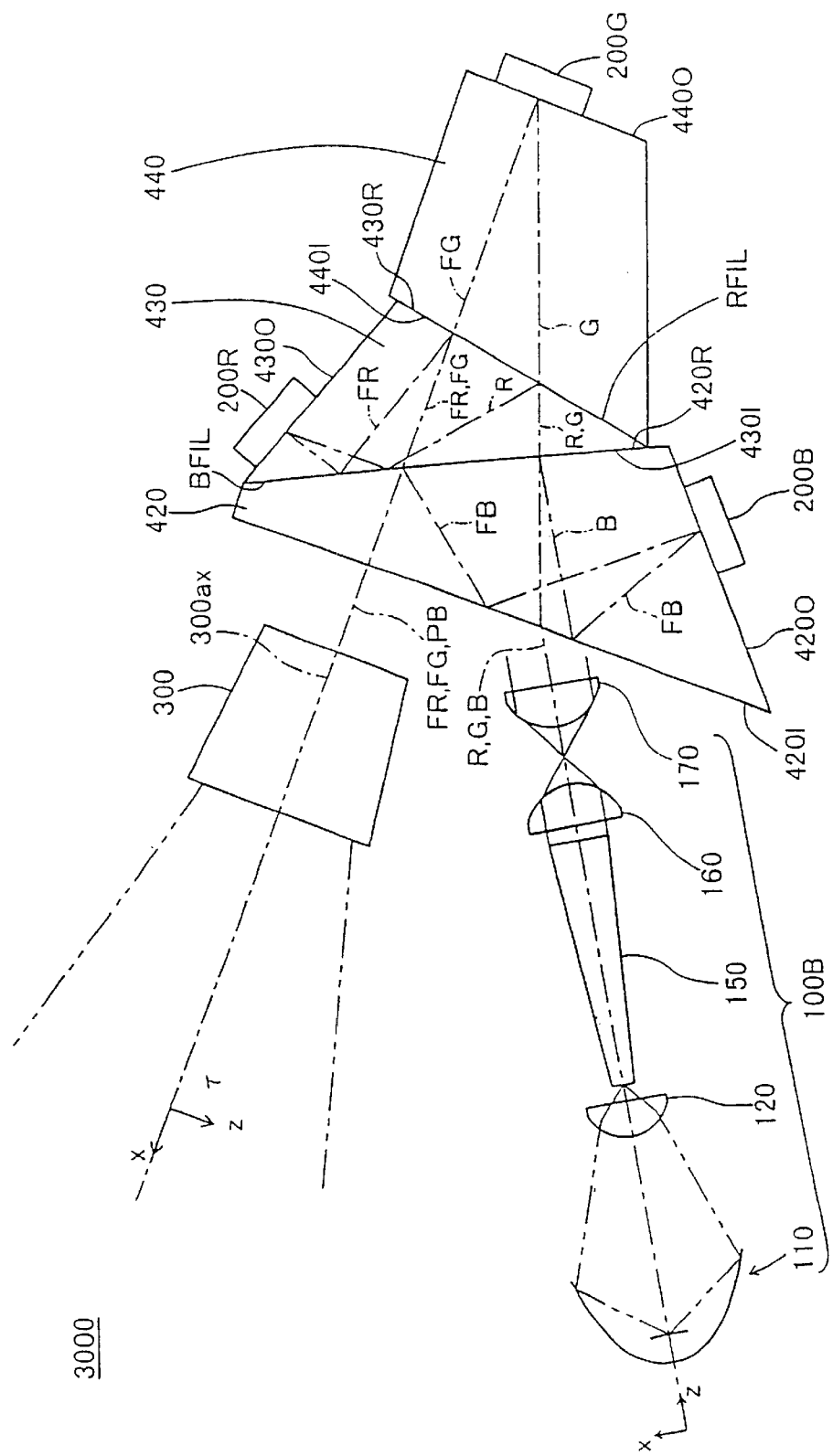
FIG. 10 is a schematic plan view showing a construction of a principal part of a projector according to a third embodiment of the present invention.

FIG. 10 is a schematic plan view showing a construction of a principal part of a projector according to a third embodiment of the present invention. A projector 3000 includes an illuminating optical system 100B, a color light separating-synthesizing prism 400, three micro-mirror-type optical modulation devices 200R, 200G, and 200B, and a projection lens 300. The projector 3000 is characterized by including the three micro-mirror-type optical modulation devices 200R, 200G, and 200B, and the color light separating-synthesizing prism 400.

The illuminating optical system 100B differs from the illuminating optical system 100 shown in FIG. 1 in that the color wheel 130 is omitted. Therefore, unlike the illuminating optical system 100 emitting cyclically the red light R, the green light G, and the blue light B, the illuminating optical system 100B emits illumination light including respective color light.

The color light separating-synthesizing prism 400 has a structure such that three prisms 420, 430, and 440 are bonded one to the other. A blue-light-reflecting film BFIL is formed between a side face 420R of a first prism 420 and a side face 430I of a second prism 430 which are bonded to each other. In addition, a red-light-reflecting film RFIL is formed between a side face 430R of a second prism 430 and a side face 440I of a third prism 440 which are bonded to each other. These reflecting films BFIL and RFIL are usually formed of a dielectric multilayer.

On one side face 430$\overline{O}$ of side faces of the second prism 430 excluding the side faces 430I and 430R, there is provided a micro-mirror-type optical modulation device 200R for the red light R. On a side face 420$\overline{O}$ facing the micro-mirror-type optical modulation device 200R of side faces of the first prism 420 excluding the side face 420I into which light from the illuminating optical system 100B enters and the side face 420R bonded to the second prism 430, there is provided a micro-mirror-type optical modulation device 200B for the blue light B. On a side face 440$\overline{O}$ of a third prism 440 perpendicular to the central axis 300ax of the projection lens 300, there is provided a micro-mirror-type optical modulation device 200G for the green light G. These micro-mirror-type optical modulation devices 200R, 200G, and 200B are not necessarily provided in contact with the side faces 420$\overline{O}$, 430$\overline{O}$, and 440$\overline{O}$.

The light emitted from the illuminating optical system 100B and including the red light R, the green light G, and the blue light B enters from the side face 420I of the first prism 420 to enter the blue-light-reflecting film BFIL. In order to simplify the description, light beams passing the color light separating-synthesizing prism 400 and thereafter, only the central light beam (one-dot chain line) is representatively shown in the drawing.

Of the light entering the blue-light-reflecting film BFIL, the blue light B is reflected by the blue-light-reflecting film BFIL. The blue light B reflected by the BFIL is usually divided into light transmitted by the side face 420I and light reflected by the side face 420I. The blue light B reflected by the side face 420I enters the micro-mirror-type optical modulation device 200B for the blue light B. Incidentally, if the incident angle of the light reflected by the blue-light-reflecting film BFIL to the side face 420I is large, the ratio of the reflected light can be increased. Furthermore, if the incident angle is increased to a critical angle or larger, the light can be totally reflected. Such adjustment of the incident angle can be realized by adjusting angles made by the side faces of the prism 420 with one to the other.

The micro-mirror-type optical modulation device 200B forms and emits blue image light FB from the entered blue light B. The blue image light FB emitted from the micro-mirror-type optical modulation device 200B is reflected by the side face 420I, and is further reflected by the blue-light-reflecting film BFIL to be emitted toward the projection lens 300. Similar to the incident light of the blue light B to the micro-mirror-type optical modulation device 200B, if the incident angle of the blue image light FB emitted from the micro-mirror-type optical modulation device 200B to the side face 420I is large, the ratio of reflected light can be increased. Furthermore, if the incident angle is increased to a critical angle or larger, the blue image light FB can be totally reflected.

On the other hand, of the light entered the blue-light reflecting film BFIL, the red light R and the green light G are transmitted by the blue-light-reflecting film BFIL to enter the second prism 430. The red light R and the green light G entered the second prism 430 enter a red-light-reflecting film RFIL. Of the light entering the red-light-reflecting film RFIL, the red light R is reflected by the red-light-reflecting film RFIL, and enters the blue-light-reflecting film BFIL again. The red light R again entering the blue-light-reflecting film BFIL is usually transmitted by the blue-light-reflecting film BFIL, however, if the incident angle thereof increases, the light to be reflected is increased, and is totally reflected when the incident angle becomes a critical angle or larger. The side faces 420R and 430I of the first and second prisms 420 and 430 on which the blue-light-reflecting film BFIL is formed are set so that the red light R entered again the blue-light-reflecting film BFIL is reflected. Therefore, the red light R entered again the blue-light-reflecting film BFIL is reflected by the blue-light-reflecting film BFIL to enter the micro-mirror-type optical modulation device 200R for the red light R.

The micro-mirror-type optical modulation device 200R forms and emits red image light FR from the entered red light R. The red image light FR emitted from the micro-mirror-type optical modulation device 200R enters the blue-light-reflecting film BFIL so as to be reflected by the blue-light-reflecting film BFIL. The red image light FR reflected by the blue-light-reflecting film BFIL is further reflected by the red-light-reflecting film RFIL to enter the first prism 420, and is emitted toward the projection lens 300 together with the blue image light FB.

On the other hand, of the light entered the red-light-reflecting film RFIL, the green light G is transmitted by the red-light-reflecting film RFIL to enter the third prism 440. The green light G entered the third prism 440 passes through the third prism 440 to enter a micro-mirror-type optical modulation device 200G for the green light G from the side face 440 0. The micro-mirror-type optical modulation device 200G forms and emits green image light FG from the entered green light G. The green image light FG emitted from the micro-mirror-type optical modulation device 200G passes through the second prism 430 to enter the first prism 420, and is emitted toward the projection lens 300 together with the red image light FR and the blue image light FB.

By the foregoing description, the red image light FR, the green image light FG, and the blue image light FB representing the color image are emitted from the color light separating-synthesizing prism 400 toward the projection lens 300. This allows the color image to be projected by the projection lens 300.

Incidentally, the light is allowed to enter the micro-mirror-type optical modulation devices 200R, 200G, and 200B at a predetermined angle, respectively, as described with reference to FIGS. 4(A)–4(C).

The illuminating optical system 100B including the light-transmitting rod 140 is also applied to the projector 3000 of the third embodiment, so that the illumination efficiency can be increased, similarly to the projector 1000 of the first embodiment. This can realize a bright projected image. Furthermore, if the light-transmitting rod 140A (FIG. 8) described in the second embodiment is used, ineffective light in the illumination light illuminating the light application surfaces 202 of the micro-mirror-type optical modulation devices 200R, 200G, and 200B can be decreased, so that the illumination efficiency of the illumination light emitted from the illuminating optical system 100B can be further increased. This can realize a brighter projected image.

In addition, the projector 3000 of the third embodiment displays a color image by synthesizing the image light emitted from the micro-mirror-type optical modulation devices 200R, 200G, and 200B corresponding to the light of three colors, respectively, so that the projector 3000 can display a color image producing little flickering and having high-precision, as compared with the projectors of the first and second embodiments.

Although the example of the color light separating-synthesizing prism 400 of this embodiment formed by the three prisms 420, 430, and 440 is shown, it is not limited thereto. For example, the color light separating-synthesizing prism may be formed by four prisms. That is, the color light separating-synthesizing prism may be a prism which separates light from the illuminating optical system into a plurality of color light to allow each of the separated color light to enter the corresponding plurality of micro-mirror-type optical modulation devices at a predetermined angle, and synthesizes and emits image light of a plurality of colors emitted from the plurality of micro-mirror-type optical modulation devices.

The present invention is not limited to the above-described embodiments and modes for carrying out the invention, and can be carried out in various forms without departing from the spirit and scope of the invention.

For example, the DMD used as the micro-mirror-type optical modulation device 200 in the above embodiments has been described in a case where it has a restriction such that the optical path of the illumination light IR projected onto the x-y plane parallel to the light application surface 202 is set to face in the direction diagonally to the lower right of about 45 degrees with respect to the x-axis (horizontal axis h), and that the incident angle of the illumination light IR to the light application surface 202 is about 20 degrees in a plane including the optical path of the illumination light IR and perpendicular to the light application surface 202. However, the DMD is not limited thereto. For example, the DMD may have a restriction such that the optical path of the illumination light IR is set to face in the direction having an inclination larger than or smaller than diagonally to the lower right of about 45 degrees with respect to the x-axis. In addition, the DMD may have a restriction such that the incident angle of the illumination light IR to the light application surface is smaller or larger than about 20 degrees in a plane including the optical path of the illumination light IR and perpendicular to the light application surface. In this case, the illumination optical system may include a light-transmitting rod in which an outline shape of an emitting plane is a quadrilateral having first and second diagonal lines of different lengths, and when the illumination light emitted from the optical element obliquely enters the light application surface at a predetermined angle, the quadrilateral may be set so that the ratio of two diagonal lines of a quadrilateral illumination area to which the illumination light is applied comes closer to 1 than the ratio of the lengths of the first and second diagonal lines.

In addition, although the example of the projector using the micro-mirror-type optical modulation device has been described in the above embodiments, the present invention is not limited thereto, and can be applied to a projector using various types of optical modulation devices for controlling the direction of emission of the illumination light applied to each of pixels according to image information to thereby emit image light representing an image.

What is claimed is:

1. A projector that projects and displays an image, comprising:

an optical modulation device that controls a direction of emission of illumination light applied to a substantially rectangular light application surface, including a plurality of pixels, for each pixel according to image information to thereby emit image light representing an image;

an illuminating optical system that emits the illumination light so that the central axis of the illumination light applied to the light application surface enters the light application surface at a predetermined angle; and a projection optical system that projects the image light emitted from the optical modulation device;

the illuminating optical system comprising:

a light source that emits light; and a light-transmitting rod through which the light emitted from the light source passes, at least a part of the light passing while being repeatedly reflected by an inner surface of the light-transmitting rod, wherein at least an outline shape of an emitting surface of the light-transmitting rod is a quadrilateral having first and second diagonal lines of different lengths.

2. A method of operating a projector that projects and displays an image, comprising:

controlling a direction of emission of illumination light applied to a substantially rectangular light application surface using an optical modulation device, including a plurality of pixels, for each pixel according to image information to thereby emit image light representing an image;

emitting the illumination light using an illuminating optical system so that the central axis of the illumination light applied to the light application surface enters the light application surface at a predetermined angle; and projecting the image light emitted from the optical modulation device using a projection optical system;

emitting light using a light source included in the illuminating optical system; and passing the light emitted from the light source through a light-transmitting rod, at least a part of the light passing while being repeatedly reflected by an inner surface of the light-transmitting rod, wherein at least an outline shape of an emitting surface of the light-transmitting rod is a quadrilateral having first and second diagonal lines of different lengths.

3. The projector of claim 2, the quadrilateral being set so that the ratio of two diagonal lines of a quadrilateral illumination area to which the illumination light is applied comes closer to 1 than the ratio of the lengths of the first and second diagonal lines, when the illumination light emitted from the light-transmitting rod obliquely enters the light application surface at the predetermined angle.

4. The method of claim 3, the quadrilateral being set so that the ratio of two diagonal lines of a quadrilateral illumination area to which the illumination light is applied comes closer to 1 than the ratio of the lengths of the first and second diagonal lines, when the illumination light emitted from the light-transmitting rod obliquely enters the light application surface at the predetermined angle.

* * * * *